US006273166B1

(12) United States Patent
Roosen

(10) Patent No.: US 6,273,166 B1
(45) Date of Patent: Aug. 14, 2001

(54) ADHESIVE TAPE FEEDING DEVICE FOR A PRESSURE CYLINDER

(76) Inventor: Reiner Roosen, von-Eiff-Strasse 23, 63456 Hanau (DE)

( * ) Notice: Subject to any disclaimer, the term of this patent is extended or adjusted under 35 U.S.C. 154(b) by 0 days.

(21) Appl. No.: 09/147,632

(22) PCT Filed: Aug. 12, 1997

(86) PCT No.: PCT/EP97/04368

§ 371 Date: Feb. 5, 1999

§ 102(e) Date: Feb. 5, 1999

(87) PCT Pub. No.: WO98/06582

PCT Pub. Date: Feb. 19, 1998

(30) Foreign Application Priority Data

Aug. 15, 1996 (DE) .......................................... 296 14 107 U

(51) Int. Cl.[7] ...................................................... B32B 31/00

(52) U.S. Cl. .......................... 156/391; 156/447; 156/494; 156/522; 156/527

(58) Field of Search .................................... 156/391, 447, 156/494, 522, 527

(56) References Cited

U.S. PATENT DOCUMENTS 2,501,341 * 3/1950 Krueger ............................... 156/450
3,915,786 * 10/1975 Collett et al. ......................... 156/355
4,030,958 * 6/1977 Stenemann ........................... 156/350
4,608,894 * 9/1986 Lee et al. ............................... 83/322
4,909,878 * 3/1990 Watanabe ............................. 156/162
5,795,432 * 8/1998 Urban ................................... 156/446

FOREIGN PATENT DOCUMENTS

3416356-A1 * 11/1984 (DE) .
3917842-A1 * 12/1990 (DE) .
0206760 12/1986 (EP) .
144334-B1 * 7/1987 (EP) .
0313510 4/1989 (EP) .

* cited by examiner

*Primary Examiner*—Mark A. Osele
(74) *Attorney, Agent, or Firm*—Dennison, Scheiner, Schultz & Wakeman

(57) ABSTRACT

The invention pertains to a device for supplying double-sided adhesive tape, drawn from a roll, to a pressure cylinder. To ensure perfect application of the tape onto the pressure cylinder, without overlapping or deflection when two tapes are applied at short distance from each other, the system includes a mounting base into which the roll is inserted axially relative to the pressure cylinder shaft, while the mounting base has a pressure element pushing the double-sided adhesive tape towards the pressure cylinder, and a cutting device axially parallel to the pressure cylinder shaft.

19 Claims, 3 Drawing Sheets

ADHESIVE TAPE FEEDING DEVICE FOR A PRESSURE CYLINDER

Figure 1:
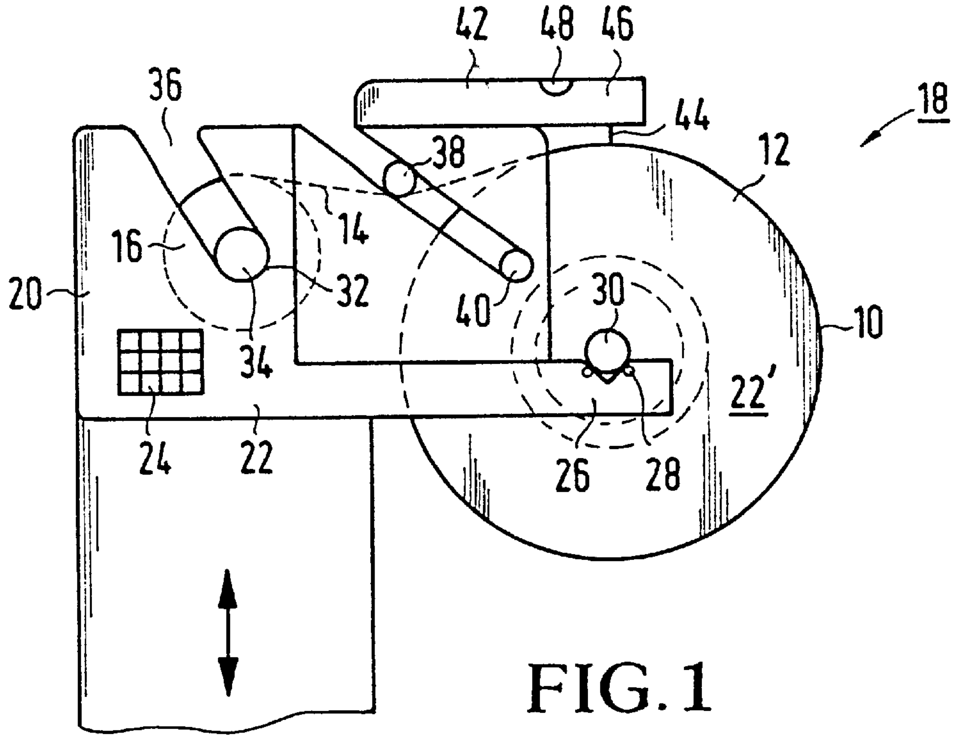

The invention relates to a device for supplying of double-sided adhesive tape drawn from a roll to a pressure cylinder.

Flexographic printing is a rotative letterpress printing method for—as an example—printing on packaging materials, forms, films or similar, in which printing plates preferably comprising photo-polymers or rubber are glued to the pressure cylinders. To permit simple attachment of the printing blocks, it is known how to supply the pressure cylinder with a double-sided adhesive tape, onto which the printing block is glued in its turn. Thanks to the adhesive tape widths available today, it is necessary here that several adhesive tapes are affixed to the pressure cylinder adjacent to one another.

To ensure a perfect attachment of the printing block, in particular when various printing blocks are applied to various press rollers in order to produce color prints, it must be ensured that the pressure cylinder is provided with the double-sided adhesive tape over its full surface and without overlap. This however presents considerable difficulty and has not yet proved possible with simple technical measures.

According to DE 39 17 842 A1, a ring is attached to a cylinder of a conveying device such as a roller track using a double adhesive tape whose width corresponds to that of the ring.

In order to connect the ends of webs unwound from rolls, adhesive tapes are provided in accordance with DE 34 16 356 A1. The connected webs are passed between both stationary and swivelable rollers.

In the older, but not yet pre-published DE 195 25 403 A1, a double-sided printing block adhesive tape for the printing industry is described.

To align printing plates in precise positions on a pressure cylinder, an auxiliary rail receiving the printing plate is provided according to EP 0 144 334 B1 that can be aligned with the longitudinal axis of the pressure cylinder.

The problem underlying the present invention is to provide a device of the type mentioned at the outset which ensures that perfect covering of the pressure cylinder with a double-sided adhesive tape is possible, without the latter overlapping or having gaps between one another in the case of adhesive tapes that have to be arranged adjacently. In addition, air bubbles or creases should be ruled out.

The problem is substantially solved in accordance with the invention in that the device comprises a mounting base in which the roll of the double-sided adhesive tape is mounted axially parallel to the pressure cylinder, in that the mounting base has a pressure element acting on the double-sided adhesive tape in the direction of the pressure cylinder, and in that an edge extends from the mounting base in that direction with a cutting element running axially parallel. Here, the pressure element in particular is mounted movably inside the mounting base using gratuity or a selectively introduced force, e.g. by cylinders, weights, and is designed as a roller.

With the teachings in accordance with the invention, it is ensured that several double-sided adhesive tape rolls are arranged side-by-side on a common shaft, and that when the double-sided adhesive tapes are peeled off each roll they are applied to the pressure cylinder side-by-side at their edges without any gap or overlap occurring. This is because the fact that the double-sided adhesive tape rolls can be disposed on a shaft axially parallel to the longitudinal axis, i.e. on the shaft of the pressure cylinder, permits a flush alignment. It is furthermore assured that the double-sided adhesive tape can be cut to length exactly, i.e. also without any overlap, since the cutting element used is also aligned axially parallel to the pressure cylinder.

Alternatively, the adhesive tape can be supplied web for web to the pressure cylinder, where for example one adhesive tape roll is movable along a shaft and hence positionable.

It is assured using the pressure element that the double-sided adhesive tape is always subject to the necessary pretensioning for being affixed without creasing to the pressure cylinder. To do so, the pressure element such as the roller can run in a slot-like receptacle between which and the pressure cylinder the adhesive tape passes, such that the latter is subjected to pretensioning in the direction of the pressure cylinder. Swiveling in the direction of the cylinder and pressing by means of—for example—setting cylinders is also possible.

It is furthermore provided that the mounting base has receptacles, with the shaft of the pressure cylinder being supportable in the receptacles or the receptacles being supportable on the shaft of the pressure cylinder.

In other words, it is possible on the one hand to leave the pressure cylinder in the printing press or affixing equipment (printing block mounting equipment), and then to lift the mounting base with its appropriate receptacle against the pressure cylinder shaft, for example hydraulically. Alternatively the pressure cylinder with its shaft can be placed inside a corresponding receptacle of the mounting base in order to then affix the adhesive tape.

The receptacles themselves should extend from side pieces of the mounting base and can be formed preferably by Vee-shaped recesses.

A particularly simple design is achieved when each side piece has a first receptacle slot for the roll of the double-sided adhesive tape or for a shaft receiving the latter, and a second receptacle slot for the pressure element designed as a pressure roller. In this case the second slot runs in the direction of the shaft of the pressure cylinder, so that as a result the pressure roller always tries to slide inside the second slot in the direction of the pressure cylinder, thereby subjecting the double-sided adhesive tape to the necessary pretension.

Alternatively, the pressure element can be moved up against the pressure cylinder using adjusting cylinders.

In accordance with a further proposal of the invention, it is provided that the device has a work surface alone which the adhesive tape can be passed and on which the pressure cylinder rests rotatably, and that a lever element acts on the shaft area facing away from the work surface. The pressure cylinder is thus clearly fixed in position in order to permit rotation of the pressure cylinder. As a result, the adhesive tape is automatically applied to the surface of the pressure cylinder. It is then only necessary to cut the adhesive tape to the required length.

A receptacle for the double-sided adhesive tape or a shaft receiving this receptacle can extend from the work surface itself. The appropriate receptacles can be designed as legs or side pieces and are preferably adjustable relative to one another in order to be adjusted to the width of the pressure cylinder.

In addition, the shaft of the double-sided adhesive tape can be tensionable in order to pretension the double-sided adhesive tape when it is unwound.

In an embodiment of the invention, it is provided that both the pressure cylinder and the double-sided adhesive tape roll(s) or their shaft are mounted in a receptacle such as a Vee-shaped receptacle in side pieces of a mounting base, with the double-sided adhesive tape also being subjected to pretensioning in the direction of the pressure cylinder.

It is provided in particular that several double-sided adhesive tape rolls extend from a common shaft, with the double-sided adhesive tape rolls being arranged side-by-side on the shaft.

Further details, advantages and features of the invention are shown not only in the claims and in the features they contain—singly and/or in combination—but also in the following description of preferred embodiments shown in the drawing.

Figure 2:
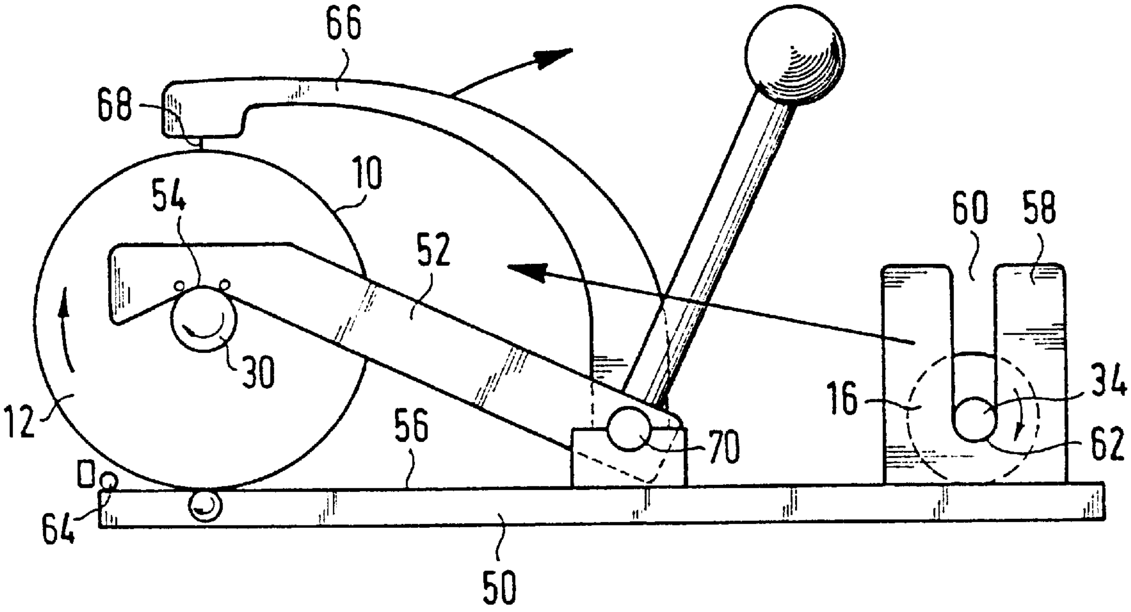
Figure 3:
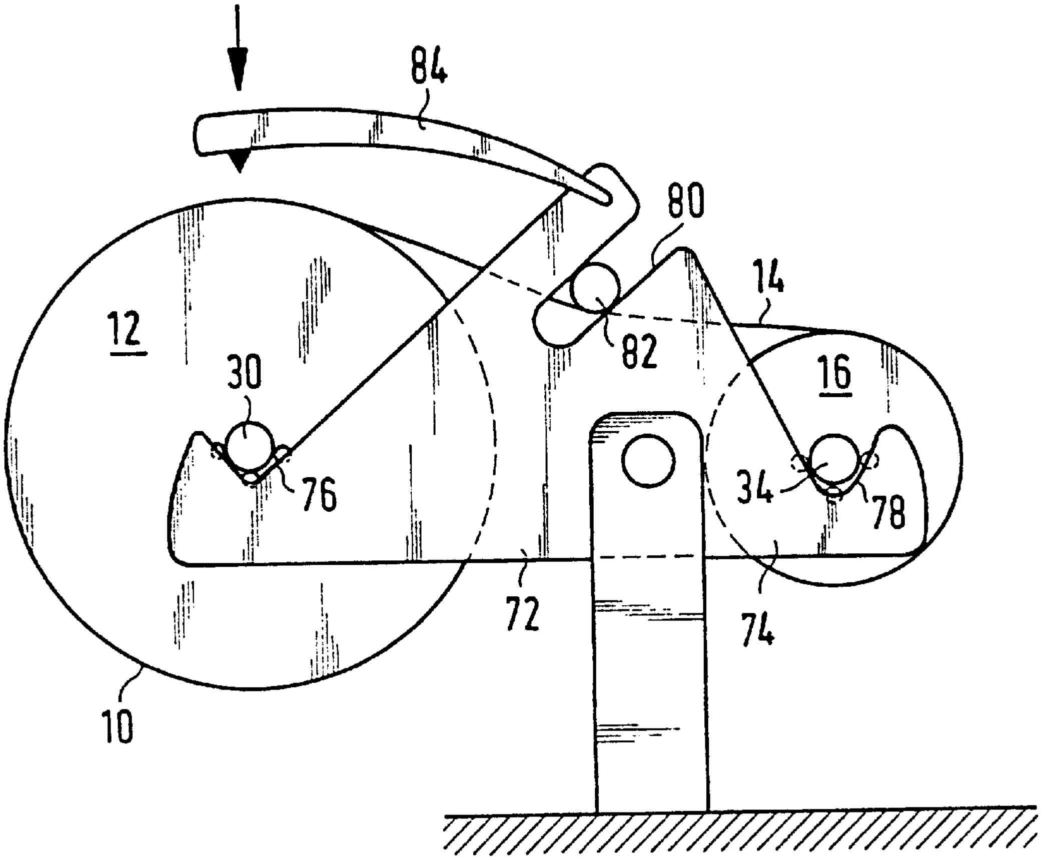
Figure 4:
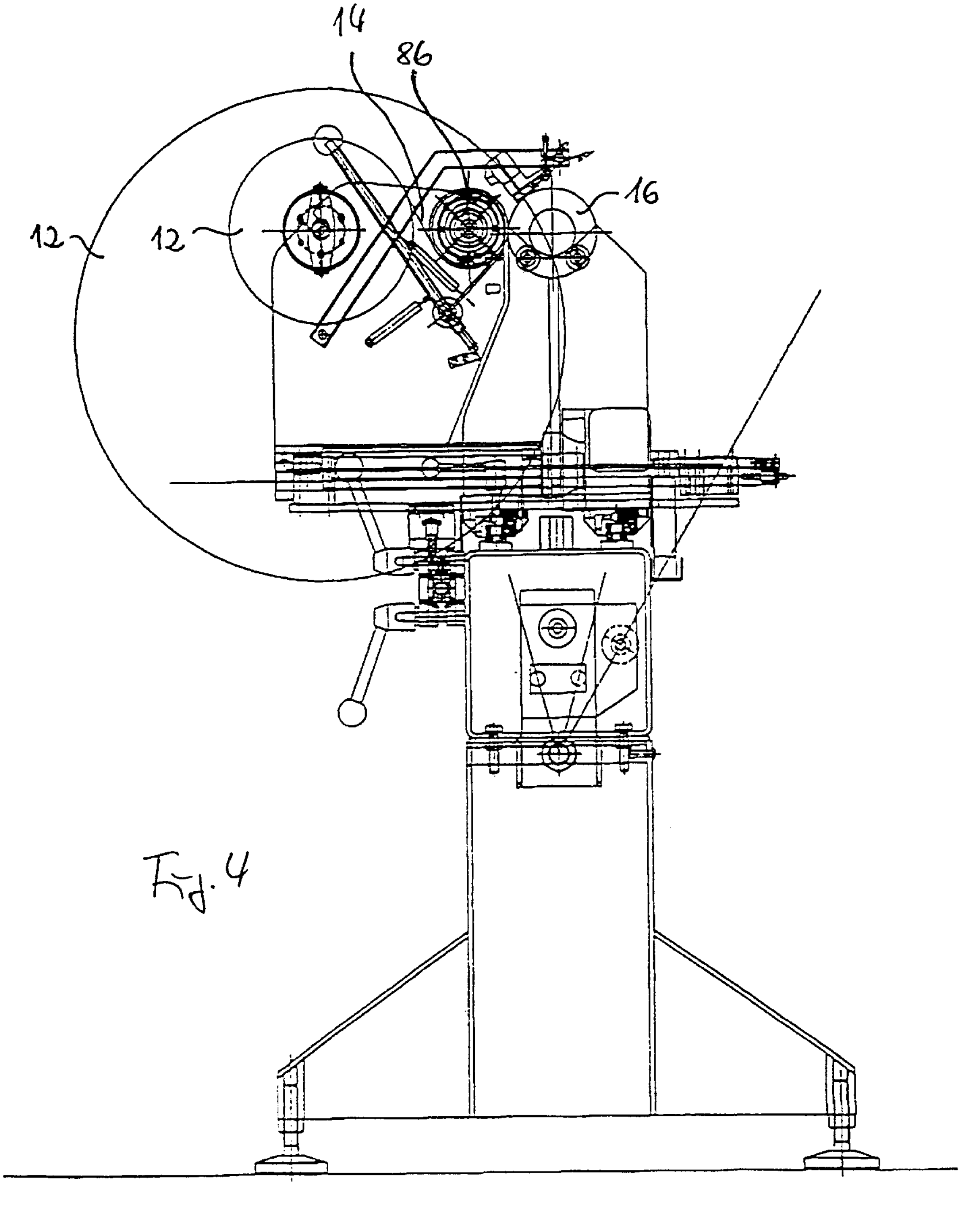

In the drawing,

FIG. 1 shows a first embodiment of a device for supplying a double-sided adhesive tape, FIG. 2 shows a second embodiment of a device for supplying a double-sided adhesive tape, FIG. 3 shows a third embodiment of a device for supplying a double-sided adhesive tape, and FIG. 4 shows a fourth embodiment of a device for supplying a double-sided adhesive tape.

In the figures, in which identical elements are provided in principle with the same reference numbers, various embodiments of devices are shown in side views, with the aid of which a double-sided adhesive tape 14 drawn from a roll 16 is to be affixed on the surface 10 of a pressure cylinder 12, for subsequent application of a printing plate such as a flexographic printing block on the outside, once a protective paper such as silicone paper has been removed from the latter. Due to the length of the pressure cylinder 12, it is necessary here that several double-sided adhesive tape sections are affixed adjacently on the surface 10 of the pressure cylinder 12, with the adhesive tape sections being affixed without gaps, side-by-side, and free of overlaps at the ends by virtue of the teachings in accordance with the invention.

FIG. 1 shows a device 18 comprising a mounting base 20 that is raised for example hydraulically in order to coat the pressure cylinder 12 installed in the proofing and assembly equipment, or its surface 10, with the double-sided adhesive tape 14.

To that end, the mounting base has side pieces 22 along the end faces 22' of the pressure cylinder 12 and adjustable to its length. For adjustment, the side pieces 22 can be moved along a ball-bearing guideway 24. A leg 26 having a Vee-shaped receptacle 28 for the pressure cylinder 12 or its shaft 30 extends from the side pieces 22. This permits clear placing of the mounting base 20 relative to the pressure cylinder 12.

Running axially parallel to the Vee-shaped receptacle 28 and hence to the shaft 30 of the pressure cylinder 12 is a receptacle 32 inside which is mounted a shaft 34 on which one or more adhesive tape rolls 16 are arranged side-by-side. The receptacle 32 extends here from a first slot 36 in order to ensure secure mounting when the double-sided adhesive tape 14 is drawn off.

Regardless of this, the shaft 30 of the pressure cylinder 12 runs, on the basis of the teachings in accordance with the invention, axially parallel to the shaft 34 of the adhesive tape rolls 16, so that as a result several adhesive tape rolls and sections of one and the same adhesive tape roll can be affixed side-by-side, and hence the adhesive tape drawn off this roll can be joined flush next to one another on the surface 10 of the pressure cylinder 12.

To ensure a perfect attachment of the double-sided adhesive tape 14 on the surface 10 of the pressure cylinder 12 without creasing, the double adhesive tape 14 passes between a pressure roller 38 and the pressure cylinder 12 such that the adhesive tape 14 is subjected to pretensioning in the direction of the pressure cylinder 12. The pressure roller 38 can here be movable inside a second slot 40 under gravity, so that an automatic adjustment to the size of the double-sided adhesive tape roll 16 or of the pressure cylinder 12 takes place without any readjustment being necessary. Alternatively, the pressure roller 38 can be adjusted by setting cylinders (FIG. 4) in the direction of the pressure cylinder.

Furthermore, a cutting device 42 with a cutting element 44 running axially parallel to the shaft 28 of the pressure cylinder 12 and hence to the shaft 34 of the double-sided adhesive tape roll 16 extends from the side pieces 22, and is used to cut the double-sided adhesive tape 14 to the required length. The cutting device 44 such as a blade extends vertically from a leg 46 of the cutting device 42, in whose upper side is provided a channel-shaped receptacle 48 inside which the pressure roller 38 can be placed. This is necessary when a new double-sided adhesive tape 14 is to be affixed to the surface 10 of the pressure cylinder 12.

In the embodiment in FIG. 2, the pressure cylinder 12, which is mounted in a proofing and assembly unit, is axially parallel aligned with a Vee-shaped receptacle 54 for the shaft 30 by means of a lever element 52. The adhesive tape 14 to be affixed to the surface 10 of the pressure cylinder 12 is then passed along the work surface 56 of the table 50.

To that end, the roll 16 or the shaft 34 receiving the latter extends from a side piece 58 containing a slot 60 on the bottom of which the shaft 34 is mounted, axially parallel to the direction of the shaft 30 of pressure cylinder 12.

To make the axially parallel alignment, the shaft 30 of the pressure cylinder 12 is fixed in position inside the Vee-shaped receptacle 54 by the lever 52. This ensures that when the pressure cylinder 12 is rotated, resulting in affixing of the adhesive tape 14 to the surface 10, its shaft 30 is always axially parallel to the shaft 34 of the double-sided adhesive tape roll 16.

Furthermore, a cutting device 66 with a cutting element such as a blade 68 running parallel to the shaft 34 of the double-sided adhesive tape roll 16 and hence to the shaft 30 of the pressure cylinder 12 extends from the table 50. The cutting device 66 can be swiveled about an axis 70 about which the lever 52 is rotatable.

The embodiment in FIG. 3 corresponds in its design principle to that of FIG. 1, with the proviso that both the shaft 34 of the double-sided adhesive tape roll 16 and the shaft 30 of the pressure cylinder 12 are inserted in a mounting base 72 or its side pieces 74. To that end, Vee-shaped receptacles 76, 78 axially parallel to one another are provided in the side pieces 74. Rollers, not indicated in detail, can project into the receptacles 76, 78 in order to support the shafts 30, 34 with reduced friction. This can of course also apply for the embodiments in FIGS. 1 and 2.

The double-sided adhesive tape 14 drawn off the double-sided adhesive tape roll 16 is subjected—as in the embodiment in FIG. 1—to the necessary pretensioning for crease-free affixing on the surface 10 of the pressure cylinder 12 by a pressure roller 82 adjustable inside a slot 80.

A cutting device 84 furthermore extends axially parallel to the shaft 30 from the side pieces 74 for cutting the adhesive tape 14.

FIG. 4 shows a further embodiment of an array with the aid of which a double-sided adhesive tape 14 can be affixed free of creases and overlaps onto a pressure cylinder 12. To that end, the adhesive tape 14 is supplied off a roll into the surface of the pressure cylinder 12, where a tensioning roller 86 acts on the adhesive tape by means of adjusting cylinders, not shown in detail, such as pressure cylinders, such that the adhesive tape 14 is affixed to the surface of the pressure cylinder 12 free of creases.

The adhesive tape 14 can be on several individual rolls lined up on a shaft or on a single roll which is adjusted along the shaft, in order to affix strips of adhesive tape side-by-side on the surface of the pressure cylinder 12.

What is claimed is:

1. A device (18) for supplying double-sided adhesive tape (14) drawn from a roll (16) to a pressure cylinder (12), wherein the device (18) comprises a mounting base (22, 72) in which a roll (16) of double-sided adhesive tape (14) is mounted axially parallel to a cylinder shaft (30) of a pressure cylinder (12), wherein the mounting base has a pressure element (38, 64) acting on the double-sided adhesive tape in the direction of the pressure cylinder (12), and wherein a cutting device (42, 66, 84) extends from the mounting base with a cutting element (44, 68) running axially parallel to the pressure cylinder shaft.

2. Device according to claim 1, wherein the pressure element (38, 82) is a roller element mounted movably inside the mounting base (22, 72) preferably using gravity.

3. Device according to claim 1, wherein the mounting base (22, 72) has receptacles (28, 76), with the shaft (30) of the pressure cylinder (12) being supportable in the receptacles or the receptacles being supportable on the shaft of the pressure cylinder.

4. Device according to claim 3, wherein the receptacles (28, 76) extend from side pieces (22, 74) of the mounting base (20, 72) and are formed preferably by Vee-shaped recesses.

5. Device according to claim 4, wherein the preferably Vee-shaped receptacles (28, 76) for the pressure cylinder shaft (30) are in each side piece (22, 74).

6. Device according to claim 1, wherein the mounting base (20) can be lifted in the direction of the pressure cylinder shaft (30) preferably hydraulically.

7. Device according to claim 1, wherein the pressure cylinder shaft (30) can be inserted into a mounting base (72).

8. Device according to claim 1, wherein the side pieces (22, 74) have a (first) receptacle slot (36) for the roll of the double-sided adhesive tape (14) or a shaft (30) receiving the latter, and a (second) receptacle slot (40, 80) for the pressure element designed as a pressure roller (38, 82).

9. Device according to claim 1, wherein the cutting device (42, 84) extends from the side pieces (22, 74).

10. Device according to claim 1, wherein the side pieces (22, 74) are adjustable relative to one another.

11. Device according to claim 1, wherein at least one of the side pieces (22, 74) is disposed movably along a ball-bearing guideway (24).

12. Device according to claim 1, wherein the device has a work surface (56) along which the adhesive tape (14) can be passed and on which the pressure cylinder (12) is rotatably supported and on whose shaft side facing away from the work surface acts a lever element (52) for fixing the position.

13. Device according to claim 12, wherein receptacles (58) for the double-sided adhesive tape roll (16) or its shaft (34) extend from the work surface (56).

14. Device according to claim 1, wherein the shaft (34) for the double-sided adhesive tape (14) is tensionable.

15. Device according to claim 1, wherein both the shaft (30) of the pressure cylinder (12) and the double-sided adhesive tape roll (16) are mounted in a receptacle such as a Vee-shaped receptacle (78) in a side piece (74) of the mounting base (72).

16. Device according to claim 1, wherein several double-sided adhesive tape rolls (16) are disposed side-by-side on a common shaft (34).

17. Device according to claim 1, wherein a pressure roller (86) acts on the double-sided adhesive tape (14) to be drawn off a roll, on which pressure roller a selectively introduced force acts such that the adhesive tape (14) can be disposed free of creases on the surface of the pressure cylinder (12).

18. Device according to claim 1, wherein the pressure roller (86) is adjustable using setting cylinders.

19. A device for applying tape to a cylinder comprising:

a mounting base;

a cylinder having an axis and a shaft rotatably mounted on the mounting base;

a roll of tape having an axis rotatably mounted on the mounting base, the axis of the roll of tape being parallel to the axis of the cylinder, and having a first end attached to said cylinder; and, a pressure element supported by the base for acting on the tape in the direction of the pressure cylinder.

* * * * *